July 15, 1952   J. F. DREYER   2,603,129
DIAL INDICATOR HAVING POLARIZING ELEMENTS
Filed May 1, 1947   3 Sheets-Sheet 1
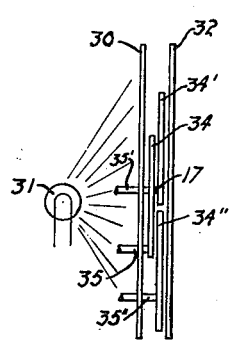
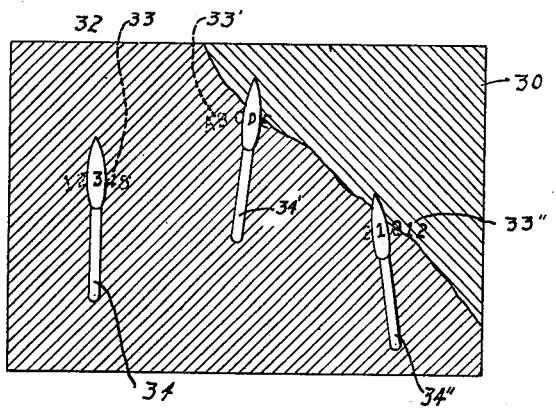
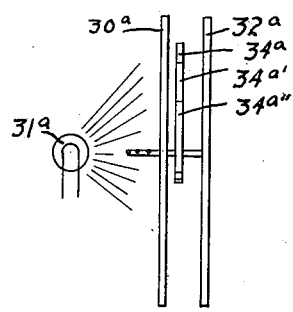
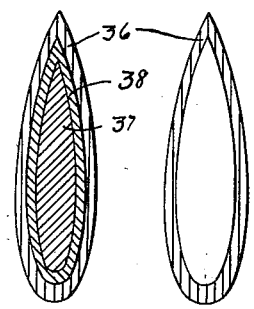
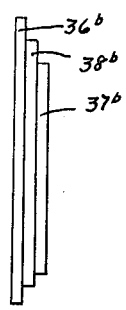
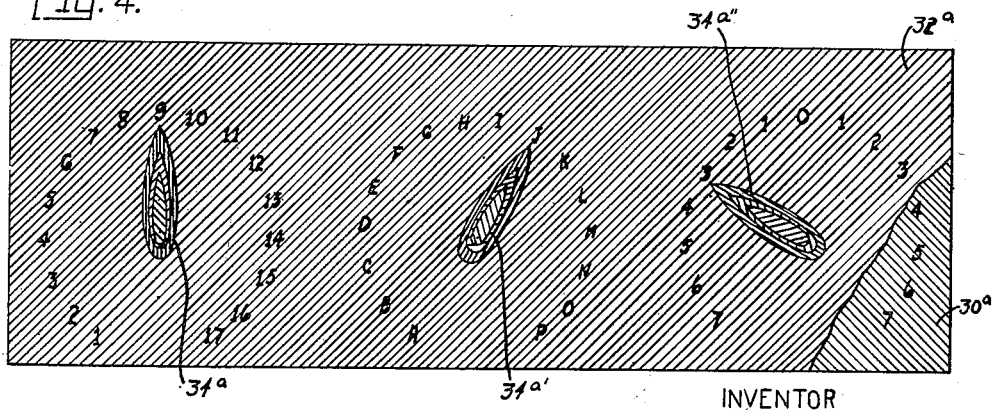
INVENTOR
JOHN F. DREYER
BY: Blair, Curtis and Hayward
ATTORNEYS July 15, 1952            J. F. DREYER            2,603,129
DIAL INDICATOR HAVING POLARIZING ELEMENTS
Filed May 1, 1947            3 Sheets—Sheet 2
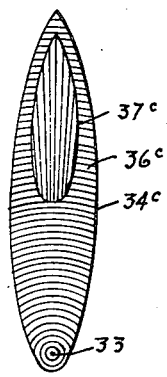
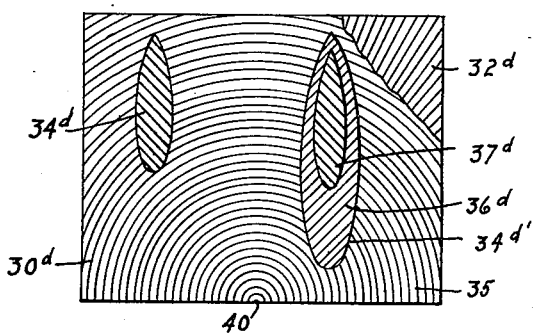
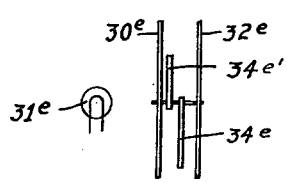
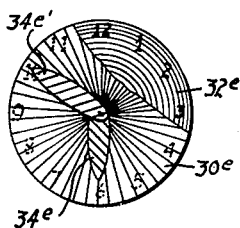
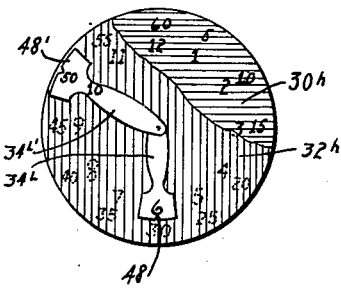
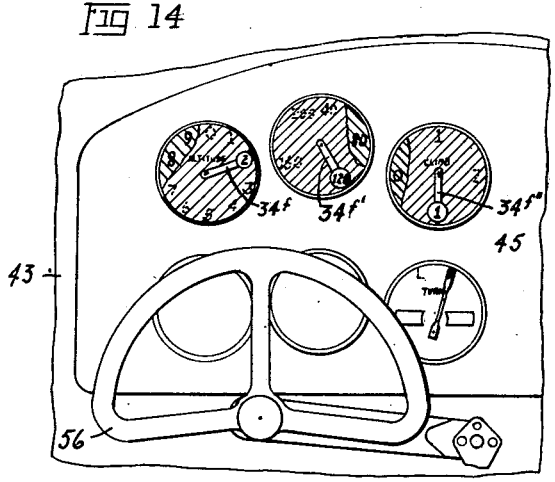
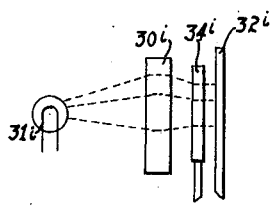
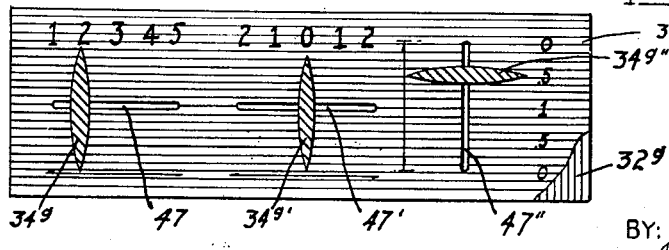
INVENTOR
JOHN F. DREYER
BY Blair, Curtis and Hayward
ATTORNEYS July 15, 1952  J. F. DREYER  2,603,129
DIAL INDICATOR HAVING POLARIZING ELEMENTS
Filed May 1, 1947  3 Sheets-Sheet 3
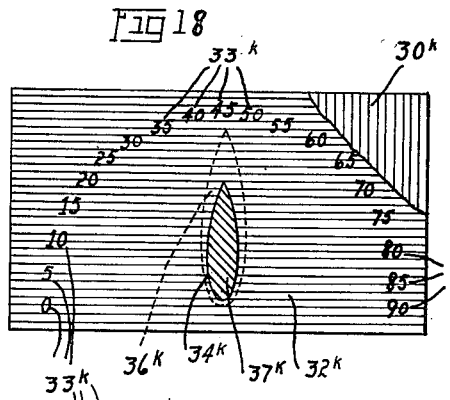
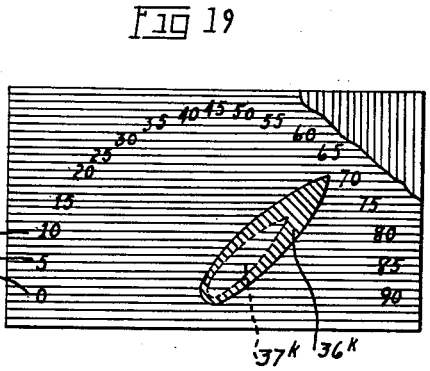
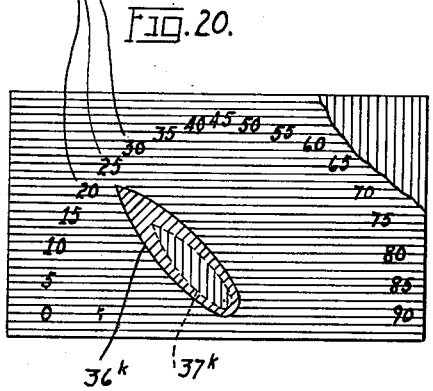
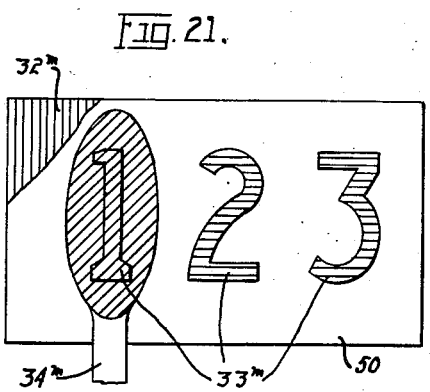
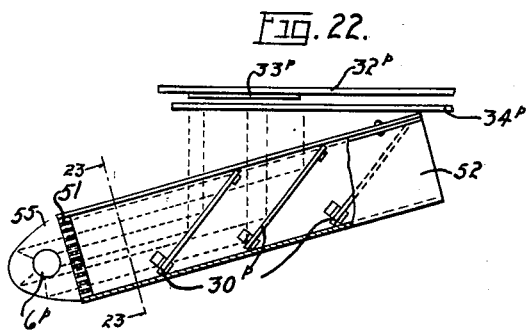
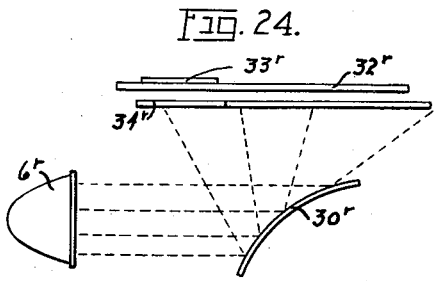
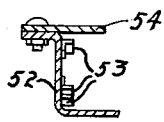
INVENTOR
JOHN F. DREYER
BY: Blair, Curtis and Hayward
ATTORNEYS Patented July 15, 1952

2,603,129

UNITED STATES PATENT OFFICE 2,603,129

DIAL INDICATOR HAVING POLARIZING ELEMENTS

John F. Dreyer, Cincinnati, Ohio

Application May 1, 1947, Serial No. 745,267

8 Claims. (Cl. 88—65)

This invention relates to a selective illuminating device, especially indicators, signals, advertising devices and the like. More particularly the invention relates to a device for selectively illuminating limited areas of a dark screen.

It is an object of the invention to provide a device adapted to give a clearly illuminated indicator which can at all times be read in the dark without need for undesirable illumination of other areas. It is an object of a more specific feature of my invention to provide selective illumination of one of a series of indicia or of an area adjacent to such selected indicia, in lieu of the ordinary hand or pointer which covers or approaches the indicia.

According to my invention this object is achieved by presenting the indicia on a normally opaque screen capable of being rendered transparent, illuminating the screen and then in lieu of a pointer provide a moving indicator element which modifies the illumination falling upon it to light for which the screen is transparent or translucent, thus illuminating the area of the screen which it occupies at any instant.

Another object is to eliminate distracting visibility from all but desired ones of a plurality of otherwise viewable objects, or areas. A further object is the provision of viewable apparatus wherein certain viewable features or areas thereof are pointed up with particular effectiveness. Other objects will in part be obvious and will in part appear hereinafter.

These objects are attained according to the present invention by use of a transparent or translucent polarizer (also sometimes referred to as the analyzer) over a dial and indicator, the indicator and the means for illuminating it being adapted to pass on toward the polarizer a light to which the polarizer is transparent or translucent, while other illumination is substantially blocked by the polarizer. In most cases these objects are attained according to the present invention by the use of a polarizer arranged in the path of the light by which a dial etc., is seen and a crossed polarizer, the "analyzer," for blocking the polarized light from the first polarizer, with an indicator plate or hand between these polarizing plates which so alters polarized light from the first that a substantial part of it can pass beyond the second.

This indicator plate can be any of the materials known to convert light to elliptical or circular polarization or to "rotate" the plane of polarization; it may operate by transmission or by reflection of the light. Special desirable effects are attained by the invention by use of particular types of such materials, as will be more fully set forth below.

By use of a transparent material in which the molecules are oriented to give an optic axis, whether by crystallization as in mica, quartz or calcite crystals, etc., or by mechanical alignment of long molecules as in cellophane and other stretched transparent films and natural or stretched artificial fibers, etc., a variety of effects can be attained depending on its thickness and optical activity (rotatory power), or lack of it, and the relation of its optic axis to the direction of the light and the plane of polarization (considered here as the plane of the electric vector of the polarized wave).

It is known that when the optic axis and the surfaces of such a plate are normal to the direction of the polarized light, and the plane of polarization is neither parallel nor perpendicular to the optic axis, the plane polarized light will be changed to elliptically polarized light, which of course will pass to a substantial extent, beyond the second polarizer. If the plate is what is known as a "quarter wave plate" (i. e., is of thickness to introduce a phase difference of one quarter wave between the two component waves into which the light is broken by the indicator plate) and if the optic axis is at 45° to the plane of polarization, the plane polarized light will be converted into circularly polarized light. If it is a half wave plate, the two component vibrations will be 180° out of phase and will behave like plane polarized light with its plane of polarization at an angle to the plane of the incident light varying from 0°, when the optic axis is parallel or perpendicular to the electric vector, to 90° when the optic axis is at 45° and back to 0° when the optic axis is again perpendicular or parallel. If it is a full wave plate (phase difference of 360° or multiples thereof) the polarization of emergent light will be affected in much the same way as with the half wave plate except that the plane of polarization for a given angle between optic axis and electric vector of the incident light, the resulting plane of polarization with a full wave plate will be perpendicular to that for the half wave plate. As the angle between the optic axis and the plane of vibration increases, the emergent light increasingly exhibits a component vibrating on a vector perpendicular to the original plane of polarization; and, to the extent that the vibrations on the two vectors are out of phase, the resultant light will be elliptically polarized with an increasing minor axis up to 45°. Between 45° and 135° this minor axis remains constant while the axis which started out as the major axis decreases to zero (at 90°) and again increases to its original value (at 135°). From 135° to 180° the minor axis again decreases to 0 while the major axis remains constant. To the extent that such change occurs, light will pass the analyzer with intensities increasing between 0 and 45° to a maximum for the range 45°-90°.

If the optic axis is inclined to the direction of the light and to its plane of polarization, the degree of ellipticity and the direction of the major and minor axes will be affected.

If the optic axis of the indicator plate is parallel to the direction of the light and the material is optically active, there will be a rotation of the plane of polarization, which again will allow light to pass the second polarizer to the extent that its plane of polarization departs from that of the incident light. A like effect is produced in optically active isotropic materials, liquid or solid, wherein the rotatory power depends upon arrangement of atoms in the molecules rather than of molecules in the crystal (as in quartz).

In the case of such optically active (rotatory) materials, the angular shift of the plane of polarization depends upon the wave length of the transmitted light. Therefore, white light undergoes a "rotatory dispersion" so that with different angular adjustment of the second polarizer, or different thicknesses of the indicator plate, different colors will be allowed to pass. A color effect is also observed with a full wave plate (an oriented plate adapted to introduce a full wave phase difference for incident light of a particular wave length) with its optic axis at an oblique angle to the plane of polarization. The oblique arrangement with respect to the plane of polarization gives elliptically polarized light, and the second polarizer converts this to opposite vibrations in the same plane. If the opposite vibrations are in phase (as they will be with a full wave plate) they extinguish each other by interference. But since a given thickness of material is a full wave plate for only a particular wave length light, the color of the transmitted light depends upon the thickness of the wave plate. In this case no dispersion of colors is produced by the wave plate and the emergent light is still white; but when it is passed through the analyzer, destructive interference of certain wave lengths results in brilliant colors. These effects are utilized in my present invention as will be fully explained below.

Still another way of modifying the polarization of light has long been known in the reflection and refraction. When plane polarized light is reflected or refracted at certain angles of incidence and azimuth ("azimuth" here means the angle between the plane of incidence and the plane of polarization) it is more or less altered to elliptical polarization or plane polarization in a plane transverse to that of the incident light.

With transparent or mirror surfaces and homogeneous materials of optically accurate form, special effects are attainable such as variable intensity, changing with angular adjustment which can be predetermined to give certain intensities for certain positions. With non-homogeneous materials or irregular surfaces, etc., various of the above-mentioned effects are combined more or less at random to give as a resultant light which is largely anisotropic and is therefore referred to as depolarized. This effect also may be used, as hereinafter set forth, for purposes of the present invention.

Using one or more of these effects, an indicator moving between two crossed polarizing plates can be made to illuminate certain indicia with light of a desired character at certain angular positions only, or at all positions, while the rest of the dial or field remains darkened by the crossed polarizers.

Although in the drawings and in the following specification I have shown a preferred embodiment of my invention and various alternatives and modifications thereof, it is to be understood that these are not intended to be exhaustive nor limiting of the invention, but, on the contrary, are given with a view to illustrating and explaining the principles of the invention and their embodiment for practical use, in order that others skilled in the art may be enabled to adapt and modify them in numerous embodiments and modifications, each as may be best suited to the conditions of any particular use.

In the drawings:

Fig. 1 is a diagrammatic side view of an instrument panel embodying the invention;

Fig. 2 is a front view thereof with the front plate partly broken away;

Fig. 3 is a view similar to Fig. 1 showing a modified arrangement wherein different parts of the points are differentially polarized;

Fig. 4 is a front view thereof with the front plate partly broken away;

Fig. 5 is an enlarged front view of one of the pointers thereof;

Fig. 6 is a similar view of one of the elements of the composite pointer of Fig. 5;

Fig. 7 is a similar view of another of the elements;

Fig. 8 is a similar view of still another of the elements;

Fig. 9 is an enlarged side view of an assembled pointer;

Fig. 10 is a front view of a modified form of pointer;

Fig. 11 is a front view of still another form of pointer and dial with the front plate (analyzer) partly broken away;

Fig. 12 is a diagrammatic side view of a clock without the case;

Fig. 13 is a front view thereof with the cover plate partly broken away;

Fig. 14 is an interior view of a portion of an airplane looking at the front of the instrument panel with the cover plates of the several dials partly broken away;

Fig. 15 is a front view of still another form of panel with the cover plate partly broken away;

Fig. 16 is a similar view of a modified form of clock;

Fig. 17 is a view similar to Figs. 1, 3 and 14, but showing another embodiment of the invention;

Fig. 18 is a similar view of still another form of panel with the pointer in one position;

Fig. 19 is the same view as Fig. 18, but showing the pointer in another position;

Fig. 20 is the same view showing the pointer in a third position;

Fig. 21 is a front view of another type of dial again with the cover plate partly broken away;

Fig. 22 is a fragmentary diagrammatic view in longitudinal vertical section of another embodiment using reflective type multiple glass plate polarizer;

Fig. 23 is a fragmentary view in transverse section taken on line 23—23 of Fig. 22; and Fig. 24 is a diagrammatic view on a section similar to that of Fig. 22 showing another embodiment using a dichroic mirror as the polarizer.

In the embodiment of the invention illustrated in Figs. 1 and 2 there is shown an instrument dial 5 which has a translucent plate 30 having a smooth front face coated with a polarizing material positioned to pass light polarized in parallel diagonal planes indicated by the diagonal lines running from the upper left to the lower right in Fig. 2. Behind this is suitable lighting means exemplified by the electric lamp bulb 31; and spaced in front of it is a cover plate 32 of glass or other transparent material coated on its back with a polarizing material. Since the polarizing coating is oriented in diagonal planes, as indicated by the diagonal lines running from the upper right to the lower left in Fig. 2, at right angles to the plane of polarization of light passed by the first polarizer 30, the cover plate 32 acts as an analyzer, i. e., it blocks the passage of light polarized on the planes established by plate 30.

In this system at any convenient location—on the front face of the plate 30 in the present instance—are series of opaque or semi-opaque indicia indicated generally at 33, 33', and 33''. The series 33 is composed in the present instance of consecutive numerals. The series 33' is composed of letters, and the series 33'' is composed of plus and minus numbers. These figures and letters are formed of unoriented material and due to their position between the polarizer and the analyzer are normally blotted out to a greater or lesser extent, depending on the density and efficiency of the polarizer and the analyzer.

Pursuant to the invention there are provided indicator hands as shown at 34, 34' and 34'' composed of wave-plate material, i. e., a crystalline or otherwise oriented birefringent sheet material. This material may be a stretched sheet, such as cellophane, cellulose nitrate, cellulose acetate, or other cellulose ester or ether, vinyl polymers, such as vinyl chloride-acetate copolymer, polyvinyl alcohol, rubber chloride (Pliofilm), etc.

These hands are adapted to point out, and advantageously to sweep over, the respective series of indicia 33. As shown, these hands 34 are mounted respectively on shafts 35 and extend between the plates 30 and 32, the shafts being rotated by the usual mechanism (not shown), to desired indicating positions representing, e. g., the operation of a vehicle or other mechanism or system.

The indicator hands 34, which are leaf-shaped in the present instance, are made broad enough to cover one of the indicia and preferably a considerable space on each side. Because of the interposition of the wave plate material of the hand, the plane of polarized light from the polarizer 30 is rotated or ellipticized, so that it passes through the analyzer 32; and thus whichever one of the indicia lies under a pointer will show up clearly, whereas the other indicia will not be sufficiently visible to distract the eye from the readings which are highlighted by the underlying hand.

The indicia 33 instead of being obscured by the crossed polarizers may be made to pass the polarized light or be illuminated by other light, and each hand 34 may give a transparent spot or line which merely points to particular indicia. Moreover, where pivoted hands are used so that the hand is rotated through a wide range with respect to the polarizing plane of plates 30 and 32, advantageously different portions of the hands may be differently oriented so that, for any effective position of each hand, at least one portion thereof will modify a part of the incident light so as to pass it through the analyzer 32.

Such a device is shown in Figures 4–8. In this are provided a polarizer 30a and an analyzer 32a disposed in front of a source of illumination 31a; opaque or colored indicia carried on the back surface of analyzer or polarizer. Pivotally mounted between polarizer 30a and analyzer 32a are hands 34a, 34a' and 34a''. Each of these hands is composed of birefringent material, the outer rim 36 of which is molecularly oriented diagonally in one direction, and a central portion 37 which is polarized diagonally in the other direction. Additional areas may be differently oriented, e. g., an intermediate section 38. Desirably these are stamped out of separate sheets of such form as to be fitted together; but, as will be appreciated they may be shaped in any desired manner and overlapped or otherwise secured in operative relation.

Instead of using oriented birefringent material of the same character but oriented to a different direction, I may use different rotation, if a rotatory material is used, or different degrees of ellipticity with ordinary oriented materials. As shown in Figure 9, for example, a smaller portion 37b is mounted upon a larger portion 38b which is in turn mounted upon a base portion 36b. The combined thickness at the center may constitute a full wave plate and the several parts 36b, 37b and 38b may be full wave plates respectively for different colors or different fractional wave plates for given colors; or the greater thickness of the center 37b may give a different rotatory effect than in the intermediate portion 38b and both are different from the border portion 36b. A somewhat similar effect can be attained by using a strip originally formed with tapered edges.

In Figure 10 is shown a swingable hand 34c having only two portions 36c and 37c oriented arcuately and radially respectively. When this is used in lieu of the hands of Figure 4, one or both of the differently oriented portions will modify the polarized light at every position so that it will pass the analyzer. It is not essential to the broader invention that different parts of the hand be differently oriented.

Advantageously in other instances the polarizer and analyzer may be oriented radially and circularly, and the hands oriented along straight parallel lines. For example, as shown in Fig. 11 the polarizer 30d is oriented arcuately about a center 40, and the analyzer 32d is oriented radially from the same or a nearby center. One hand 34d is oriented diagonally in a given direction as shown and the other hand 34d' is composed of an inner portion 37d oriented in the same direction as the pointer 34d and an outer portion 36d oriented in a direction perpendicular thereto.

By orienting the polarizer-analyzer elements radially and circularly (or arcuately) with respect to the center of rotation of the hand, the relation of the polarized light to the indicator plate on the hand can be made uniform for all normal positions; and since the relation of the analyzer to the light from the indicator will also remain uniform, the illumination produced by the indicator will closely approach uniform intensity for all positions of the pivotally mounted hand. This is particularly desirable in the case of full circular rotation as with a clock.

Figs. 12 and 13 show a clock face comprising two crossed polarizing discs in the form of a polarizer 30e and analyzer 32e disposed in front of an illuminating means 31e and having therebetween an hour hand 34e and a minute hand 34e' composed of wave-plate material, e. g., cellophane. The numbered outer face 32e is radially oriented about the axis of rotation of the hands (e. g., as described in my Patent No. 2,400,877). The hands themselves are shown diagonally oriented so that for any position each will serve as a fractional wave plate to give elliptically polarized light, advantageously circularly polarized, to pass light through the analyzer. An arrangement such as this can be made to give bright colors, depending on the thickness of the wave plate; and the hands will appear to be individually illuminated, although illumination comes from one source. The individual hands may have different colors and the hour numbers can be made similarly to show bright illumination with or without color (depending upon whether the indicia are made of wave plate material and the particular material and its thickness, or are made of depolarizing material). Wherever the hands pass over one another or over numerals made of a wave plate material the effective thickness is additive, and thus the overlapped area may appear illuminated in a different color. A like effect may be had by using a rotatory material for the hands with its optic axis parallel to the direction of the light. If the indicia are of the same type of material, the rotation is increased and due to rotatory dispersion the indicia when overlapped by the hand show up in a different color. Other modifications may be made.

As pointed out above one important embodiment of the invention is in an airplane instrument panel. In Fig. 14 there is shown a portion of an airplane 43 having control means 44 and an instrument panel 45. The instrument panel includes an altimeter dial having a hand 34f, an air speed dial having a hand 34f', and a rate of climb dial having a hand 34f''. Each of these hands 34 has a small disc on the indicator end instead of the sharp ends of the hands 34 of the figures previously described, but otherwise the dials and hands are arranged similarly to the construction of Figs. 1 and 2, and illuminating means is similarly provided at the rear of the panel.

Fig. 15 shows still another modification. Here there are disposed between a polarizer 30g and an analyzer 32g three hands 34g, 34g' and 34g'', all of which are oriented diagonally with respect to the horizontal orientation of the polarizer and the vertical orientation of the analyzer. The hands 34g, 34g' and 34g'' are slidable in a horizontal plane in slots 47, 47' and 47''.

The hands have been referred to above broadly as being of an oriented birefringent material or an optically active or rotatory material; and it is evident from what has been said that any such material may be used so long as its angular relations in its operating range are set to produce either optical rotation or a conversion to elliptical or circular polarization. In the case of simple crystalline, or otherwise molecularly oriented, materials this means that the vector of electric vibration of the polarized light will be at an angle to the optic axis. In the case of isotropic rotatory substances which depend upon the form of the molecules rather than the form of crystals such angular relation is not essential.

In Figure 16 is shown, by way of example, an indicator (in this instance a clock) having depolarizing hands. A polarizer plate 30h carries opaque numerals as shown. The analyzer plate 32h is arranged over this, spaced from it with surfaces parallel but with the lines of orientation of the polarizing material perpendicular, as indicated. The analyzer plate, which is shown broken away in Fig. 16, will ordinarily be coextensive with the polarizer although it may be larger or smaller. The clock case or other opaque screen (not shown) will confine the light from the dial to the area of these crossed polarizers 30h, 32h. The hands 34h, 34h' in this case have discs of translucent paper or cloth, etc., of molecularly oriented fibers. The hour hand 34h is shorter so that its disc portion moves along the circular line of numerals representing the hours and the minute hand 34h' is longer so that its disc moves along the minute numerals. These discs are sufficiently larger than one numeral so that one is overlapped before the other is passed. Thus one numeral is always visible in the disc and the pointer indentations 48, 48' show the exact time.

If, with an optically active crystal, the optic axis is parallel to the direction of propagation of the polarized light or if anisotropic rotatory material is used, the effect is merely a rotation of the plane of polarization so that, at all angular positions of the hand, light will be passed through the analyzer by having its plane of polarization rotated away from the perpendicular relation at which extinction occurs. Such an arrangement is shown at Figure 17, wherein the collimating lenses 30i are used to bring all light from reflector type lamp 31i into parallelism with the optic axis of indicator hand 34i which in this case is perpendicular to the face of the plate. The indicator element 34i is made of an optically rotatory crystal, e. g. quartz, having its optical axis perpendicular to its face. This results in rotation of the plane of polarization of the light passing through the polarizer 30i so that when this light reaches the analyzer 32i it is no longer perpendicular to the polarizing axis and consequently a substantial proportion of it can go through the analyzer without extinction. Analyzer 32i serves as the protective "crystal" as before.

It has already been observed above that if the optic axis of a rotatory material is perpendicular or parallel to the direction of the light, then the plane polarized light from the polarizer will be passed without change (to be extinguished by the analyzer), whereas it will be converted to elliptically polarized light (which will pass in part through the analyzer) if its electric vector is oblique to the optic axis, and will be circularly polarized in the special case of a quarter wave plate where there is a 45° angle between the optic axis of the optically active material and the electric vector of the polarized light.

Since the destructive interference, which is produced by the analyzer when exposed to light passed through a plane-polarizer and a full-wave plate with its optic axis at an angle to the direction of the light, is selective as to wave length, depending upon the thickness of the plate, the light which is passed through the analyzer by the indicator plate will, in most cases, be colored. As the angular position of the plate changes, however, the light may change to white at one position and to dark at another position.

Thus, by using such a plate set so as to give color within the range of positions requiring attention, this color can be used to warn the operator of an abnormal reading, whereas, at the normal reading, the light is passed without color. Or a similar effect is obtained by using for the indicia in the critical range a wave-plate material and arranging the indicia so that they overlap the indicator hand. When such overlapping occurs, the effective thickness is increased, which produces a color change (if the thickness is not an exact multiple of that of a full-wave plate hand). Using a different material or a different thickness or a non-overlapping position for the indicia outside the critical range, one can make the color distinctive for that range.

The analyzer plate may be sufficiently transparent, even with cross-polarized light from the polarizer passing unchanged to the analyzer, so that the indicator dial and hand can be seen dimly at the angles which do not require special attention; or a hand like that of Figures 18–20 may be used, in which one portion is of a material which passes light through the analyzer at the normal angles, when the light from the other portion is extinguished; and the color appears only as the indicator moves to the abnormal angle. If desired, the first portion can be of such thickness, and with its optical axis at an angle such, that a different color, e. g., green appears at the normal angle while the second portion is dark; and the latter will change to red as it moves to an abnormal angle. If the indicator moves through more than 90° it may change from dark to one bright color, e. g., red, then to white light and then to a different color, e. g., blue.

Where several thicknesses of the indicator plate material are used as in Fig. 9, each area of different thickness may be made to give a characteristic color at a given angle. Thus one color may indicate a normal reading, another color a dangerously low reading, and a third a dangerously high reading. A quick glance at the instrument panel will therefore show immediately the particular dials, if any, which require attention.

Instead of color, intensity of light may be used to call attention to the abnormal readings. When the optic axis of the indicator plate is perpendicular to the direction of the light, the intensity increases up to the point where the angle between optic axis and plane of polarization is 45°. That angle may be arranged to come at the initial danger reading so that the brightest light demands attention.

Applying these principles, for example, to a speedometer or air speed indicator, the intensity of illumination or color thereof may change when a particular speed has been reached, and thus serve as a warning to the operator. An arrangement of this type is shown in Figures 18, 19 and 20. There a polarizer 30k at the back of an instrument panel is covered by an analyzer 32k at the front of the panel which carries miles-per-hour indicia 33k. Illuminating means (not shown) is provided as in the other embodiments. A pivoted hand 34k points to, but does not cover, the indicia. The hand comprises an outer portion 36k so oriented that it will be visible at the angles where the central portion 37k is dark, e. g., in the position shown in Fig. 18. The inner portion 37k may be so oriented and of such thickness that it will be vividly visible and change color as it approaches the forty-five miles per hour position of Fig. 18. In the position of Fig. 19 it may be dark again. Thus as the pointer moves from the position of Fig. 20 to the position of Fig. 18 the operator is warned that he is approaching forty-five miles per hour.

It is unnecessary to use the entire rear plate of the panel as the polarizer. In many instances it is desirable to form only the indicia themselves of oriented material. Such an arrangement is shown in Fig. 21 where the rear plate 50 is formed of an opaque material, having mounted thereon light-polarizing transparent indicia 33m set therein as windows. Over the front of the panel is an analyzer 32m, which may be perpendicularly cross-polarized with respect to the indicia 33m or may be polarized at an oblique angle such that the indicia 33m are never entirely obscured. The hand 34m is movable between the back 50 and the series of numbers 33m which constitute the polarizer. This hand is composed of wave-plate material of full-wave thickness for some wave length which is present in the illumination. When the hand moves between any number and the analyzer, the number appears in color. In the position shown in Fig. 21 it covers the "1," which accordingly shows very clearly, with a characteristic bright color, whereas the "2" and "3" are merely visible with a grey illumination (or a different color).

The polarizers, the analyzers, and the indicator plates for use in accordance with the invention may be formed in any of a variety of well-known or suitable manners, but the use of methods and materials disclosed and claimed in my Patent 2,400,877 issued May 28, 1946, are particularly desirable. It is also feasible to use a reflecting polarizer. This is shown diagrammatically by way of example, in Figures 22–4.

Referring first to Figure 22, a tubular lamp such as a fluorescent tube gas discharge lamp, or a "test-tube" type or lumiline incandescent lamp is shown at 6p surrounded by a reflector 55 adapted to reflect light along approximately parallel directions. A louvre 51 is designed to correct any serious lack of parallelism. The light which passes the louvre falls on the first of a series of tilted glass plates 30p at the "polarizing angle" (e. g., 57° from the normal for an ordinary optical glass). The part of this light which is reflected toward the analyzer 32p is wholly plane polarized. Another part of the light passes on to the next plate.

The indicia 33p may be arranged in any desired position and of any desired material and form, as fully discussed above. As shown, the indicia are of cellophane or other wave plate material having the optic axis parallel to the surface of the analyzer and at an angle to the plane of polarization of the light from the polarizer plates 30p. The indicator hand 34p is likewise of a wave-plate material, e. g., a stretched cellulose acetate strip. With this combination, the indicia 33p appear in color against a dark background, the indicator hand 34p appears in color and wherever the hand overlaps one of the indicia a different color appears, thus attracting attention to it.

In Figure 23 is shown one way of mounting the plates 30p. A frame 52 surrounds the polarizer and is provided with sloping guides or shelves 53 which hold the opposite ends of the glass plates 30p at the polarizing angle. A cover plate 54 locks the glass plates in position.

In the arrangement of Figure 24, the light comes from a parallel ray reflector lamp 6r at one side of the dial and is redirected by the convex mirror 30r over the area of the analyzer plate 32r as in the other examples. On the face of the analyzer 32r are decorative metal numerals 33r. Behind the analyzer is the indicator hand 34r.

The mirror surface 30r is a coating of a dichroic material of the character set forth in my Patent 2,400,877, e. g., as described in my copending application, Serial No. 567,350, filed December 9, 1944, now Patent No. 2,484,818, dated October 18, 1949.

Light reflected from the mirror 30r is plane polarized due to the dichroic coating. Such part of the light as passes through the hand 34r is visible through the analyzer, but the rest of the light is largely blocked by the analyzer which, therefore, remains dark.

I claim:

1. An indicator comprising a polarizer and analyzer having crossed polarizing axes and arranged to serve as an indicator dial, a series of indicia arranged between the polarizer and analyzer to identify various positions on the dial, at least a part of said indicia being of molecularly oriented birefringent material, and a hand mounted to move between said polarizer and analyzer and along said series of indicia and into overlapping relation to at least one of said birefringent indicia, at least a portion of said hand being of a single wave-retardation plate molecularly oriented birefringent material adapted to supplement the material of at least one of said overlapped indicia to modify light of certain wave lengths from the polarizer so that said light passes the analyzer while the polarized light of at least one other wave length is left with a character which is blocked by the analyzer, whereby such indicia will be brightly colored with a distinctive color when overlapped by said hand.

2. An indicator comprising a polarizer and an analyzer having crossed polarizing axes, indicia provided between the polarizer and the analyzer at spaced points laterally of the analyzer and having a substantial degree of opacity, and an indicator hand mounted for movement along the indicia between the polarizer and the analyzer so as to bring it in line with various of said indicia, at least a portion of said hand being of a layer of molecularly oriented material acting as a single wave-retardation plate for the polarized light whereby otherwise obscured indicia is brought into visibility through the analyzer.

3. An indicator comprising a polarizer and an analyzer having crossed polarizing axes, indicia provided between the polarizer and the analyzer at spaced points laterally of the analyzer and having a substantial degree of opacity, and an indicator hand mounted for movement along the indicia between the polarizer and the analyzer so as to bring it in line with various of said indicia, at least a portion of said hand being of a layer of birefringent molecularly oriented material whereby otherwise-obscured indicia are brought into visibility through the analyzer.

4. In an indicator as set forth in claim 3 wherein, of the polarizer and the analyzer, one is oriented radially and the other oriented circularly on the same axis.

5. An indicator as set forth in claim 3 wherein one portion of said hand on one side of a transverse bisector is composed of birefringent oriented material having its optic axis at an angle to the electric vector of polarized light from said polarizer, and another portion on the other side is composed of oriented birefringent material with its optic axis in a direction different from both said electric vector of the polarized light and from that of the optic axis of said first portion.

6. An indicator as set forth in claim 3 wherein one portion of said hand on one side of a transverse bisector is composed of a wave-plate material of one thickness and another portion on the other side thereof is composed of wave-plate material of different thickness.

7. An indicator as set forth in claim 3 wherein said hand is pivotally mounted to move relative to the series of indicia and in indicating relation thereto.

8. An indicator as set forth in claim 3 wherein said hand comprises a polarizing plate and a molecularly oriented birefringent plate adapted to modify polarized light to bring it at least in part onto a vector transverse to that of the original polarized light, said hand being pivotally mounted to move relative to the indicia in indicating relation thereto.

JOHN F. DREYER.

REFERENCES CITED

The following references are of record in the file of this patent:

UNITED STATES PATENTS

| Number | Name | Date |
|---|---|---|
| 2,122,225 | Wheelwright | June 28, 1938 |
| 2,313,831 | Martin | Mar. 16, 1943 |
| 2,359,456 | Young | Oct. 3, 1944 |
| 2,393,969 | Burchell et al. | Feb. 5, 1946 |
| 2,393,970 | Burchell et al. | Feb. 5, 1946 |
| 2,400,877 | Dreyer | May 28, 1946 |
| 2,404,746 | Rylsky et al. | July 23, 1946 |
| 2,427,896 | Bradley | Sept. 23, 1947 |
| 2,454,280 | Hardesty | Nov. 23, 1948 |
| 2,482,410 | Gaetjens | Sept. 20, 1949 |
| 2,511,010 | Rohr | June 13, 1950 |
| 2,552,383 | Rylsky et al. | May 8, 1951 |